United States Patent [19]

Tanaka et al.

[11] Patent Number: 5,504,496
[45] Date of Patent: Apr. 2, 1996

[54] APPARATUS FOR DISPLAYING TWO-DIMENSIONAL IMAGE INFORMATION

[75] Inventors: Satoru Tanaka; Fumio Matsui, both of Tsurugashima, Japan

[73] Assignee: Pioneer Electronic Corporation, Tokyo, Japan

[21] Appl. No.: 193,723

[22] Filed: Feb. 9, 1994

Related U.S. Application Data

[63] Continuation of Ser. No. 801,931, Dec. 3, 1991, abandoned.

[30] Foreign Application Priority Data

Mar. 13, 1991 [JP] Japan .................................. 3-047961

[51] Int. Cl.$^6$ .............................. G09G 3/00; G02B 26/10
[52] U.S. Cl. ............................ 345/32; 348/746; 359/202
[58] Field of Search ............................... 340/755; 358/60, 358/61, 62, 63, 443, 444, 474; 359/201, 202; 348/746, 747, 745; 364/723; 345/32

[56] References Cited

U.S. PATENT DOCUMENTS

| | | | |
|---|---|---|---|
| 4,003,626 | 1/1977 | Reinke et al. | 359/202 |
| 4,672,275 | 6/1987 | Ando | 358/60 X |
| 4,714,830 | 12/1987 | Usui | 359/202 |
| 4,791,591 | 12/1988 | Asanuma et al. | 364/571.04 |
| 4,941,082 | 7/1990 | Pailthorp et al. | 364/167.01 |
| 4,946,234 | 8/1990 | Sasada et al. | 359/221 |
| 5,048,904 | 9/1991 | Montagu | 359/202 |
| 5,382,984 | 1/1995 | Tsujihara et al. | 348/746 |

FOREIGN PATENT DOCUMENTS

| | | | |
|---|---|---|---|
| 0039018 | 2/1990 | Japan | 340/706 |
| 0118511 | 5/1990 | Japan | 359/202 |

Primary Examiner—Tommy P. Chin
Assistant Examiner—A. Au
Attorney, Agent, or Firm—Fish & Richardson

[57] ABSTRACT

A two-dimensional image information display apparatus in which an image of coordinates of display points which coincide with coordinates of designated point of input data is obtained on the display screen comprises laser beam source radiating a laser beam, drive signal generator generating a drive signal in accordance with the input data carrying the coordinates of designated point, and deflector for deflecting an angle of the laser beam in accordance with the drive signal, for irradiating the deflected laser beam onto the display screen, thereby obtaining a display point. The drive signal generator has memory for storing coordinates of reference points, memory for storing errors representing deviations of coordinates of a display point which are obtained when the coordinates of a reference point are used as the coordinates of a designated point from the coordinates of the reference point, interpolating device for producing errors corresponding to the coordinates of the designated point as interpolation errors by an interpolating method, and converting device for converting the coordinates of the designated point by the interpolation errors, and producing converted coordinates, so that the converted coordinates are used as the input data.

2 Claims, 6 Drawing Sheets

APPARATUS FOR DISPLAYING TWO-DIMENSIONAL IMAGE INFORMATION

This application is a file wrapper continuation of U.S. application Ser. No. 07/801,931, filed Dec. 3, 1991, now abandoned.

BACKGROUND OF THE INVENTION

1. Field of the Invention

The present invention relates to a two-dimensional image display apparatus in which a laser beam is irradiated onto the display surface such as a screen or the like while the laser beam is deflected by deflecting means such as a galvanometer or the like so that an image is displayed in accordance with input data.

2. Description of Background Information

An apparatus has already come to be widely known as Laser display apparatus, in which a laser beam emitted from a light source as means for radiating a laser beam is irradiated onto the screen while the laser beam is deflected in horizontal and vertical directions in accordance with input data carrying two-dimensional coordinates.

Figure 1:
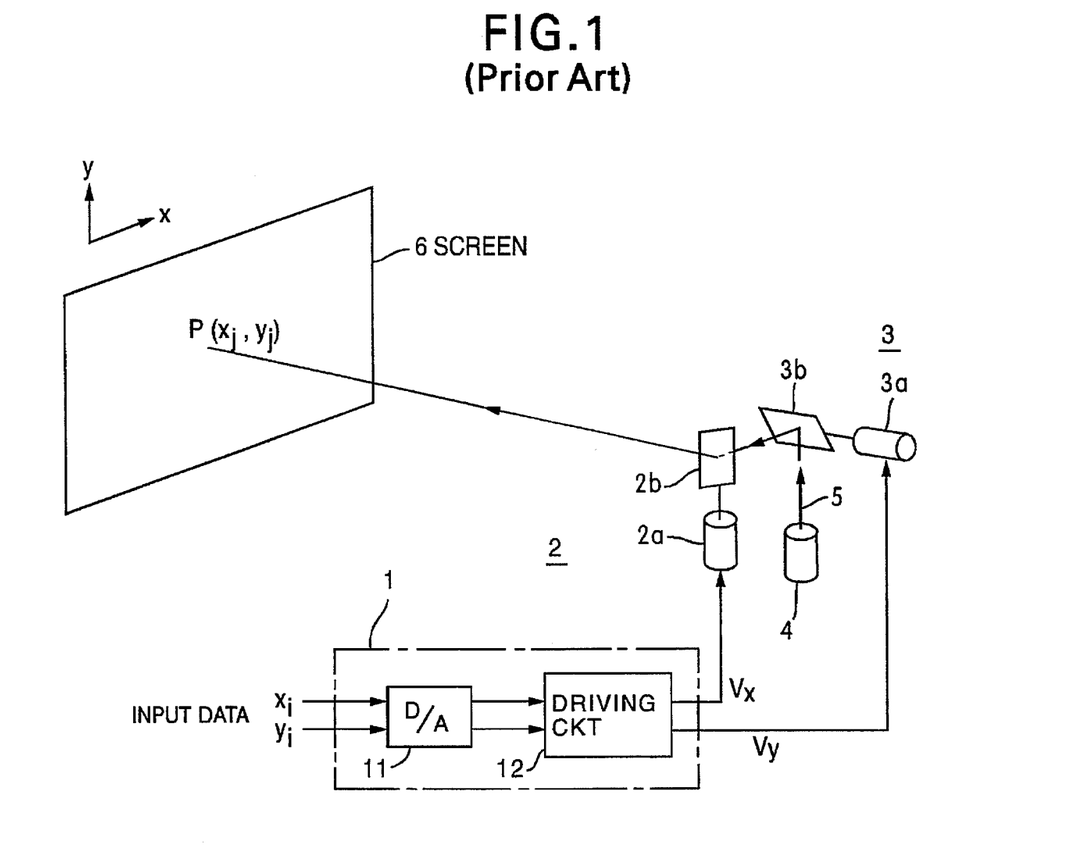
FIG. 1 is a block diagram of a conventional apparatus for displaying two-dimensional image information.

FIG. 1 shows a conventional example of such a display apparatus. In the conventional apparatus shown in the figure, a data generating circuit (not shown) such as a microcomputer or the like previously stores coordinates $(x_i, y_i)$ of each of designated points in a group of display points corresponding to an image to be displayed on the display screen. Input data of a digital signal carrying the coordinates $(x_i, y_i)$ of the designated points is supplied to a drive signal generating device 1 at predetermined timings. In the drive signal generating device 1, the input data is converted into an analog signal by means of a D/A converter 11. The analog signal is supplied to a drive circuit 12 wherein power amplification of the input analog signal is performed. A driving voltage $V_x$ which is proportional to the horizontal coordinate $x_i$ of the designated point is applied from the drive circuit 12 to a driving motor 2a of a galvanometer 2. A rotating mirror 2b is directly coupled to the drive motor 2a and a rotational angle is determined in accordance with the driving voltage $V_x$. Likewise, a driving voltage $V_y$ which is proportional to a vertical coordinate $y_i$ of the designated point is applied from the drive circuit 12 to a driving motor 3a of a galvanometer 3 and a rotational angle of a rotating mirror 3b coupled directly to the driving motor 3a is determined in accordance with the driving voltage $V_y$. In this way, the galvanometers 2 and 3 function as deflecting means for deflecting a laser beam in the horizontal and vertical directions.

A laser beam 5 radiated from a light source 4 is reflected by the rotating mirrors 2b and 3b and is irradiated onto a screen 6 as a display surface. The laser beam 5 is scanned on the screen 6 in the direction indicated by the arrow x, namely, horizontal direction in accordance with the rotation of the rotating mirror 2b. The laser beam 5 is similarly scanned on the screen 6 in the direction indicated by the arrow y, namely, vertical direction in accordance with the rotation of the rotating mirror 3b. As mentioned above, a light spot of the laser beam 5 drawn on the screen, that is, a display point is determined according to the coordinates $(x_i, y_i)$ of the designated point of input data.

Figure 2:
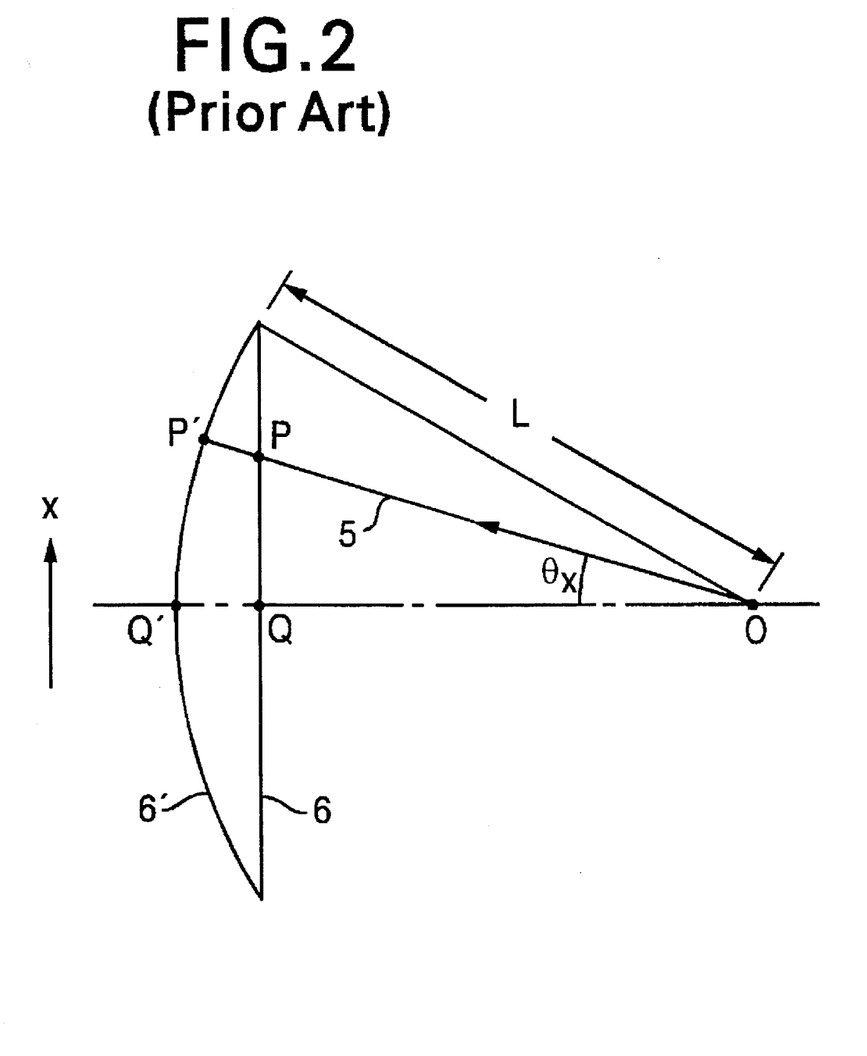
FIG. 2 is a diagram showing the manner of deflection of a laser beam 5 in the conventional two-dimensional image information display apparatus shown in FIG. 1.
Figure 7A:
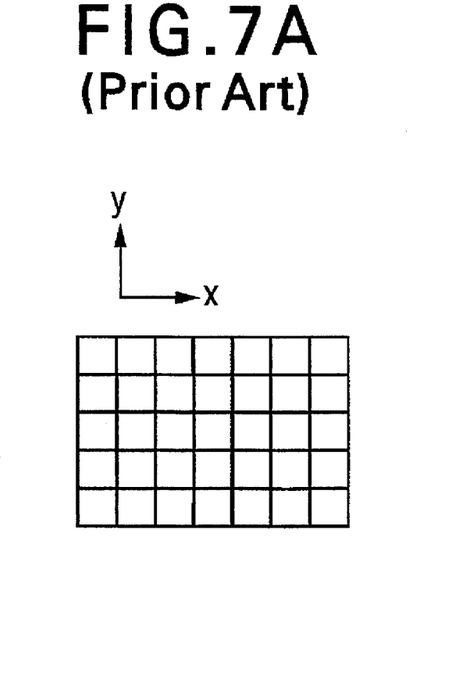
FIG. 7A is a diagram showing lattice-shaped designated points.
Figure 7B:
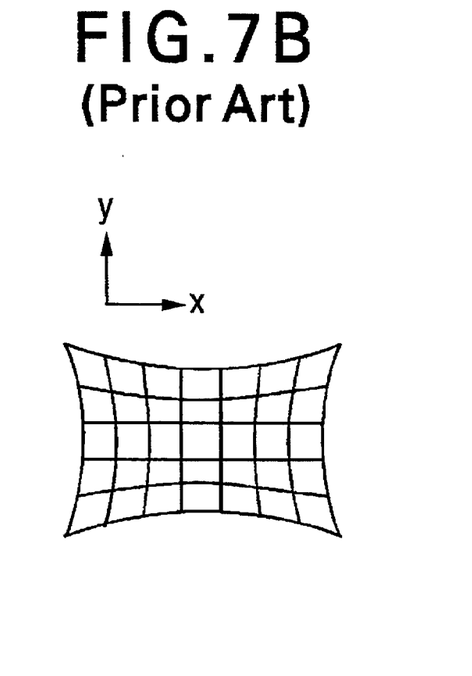
FIG. 7B is a diagram showing a pincushion distortion which occurs when coordinates of the designated points in FIG. 7A are used as input data.

In FIG. 2, the laser beam is deflected in the horizontal direction at an angle $\theta_x$ by means of the rotating mirrors 2b and 3b operating as a center point O in proportion to the horizontal coordinate $x_i$, and is irradiated to a point P on the screen 6. Although a length $L \cdot \theta_x$ of an arc Q'P' on a spherical surface 6' of a radius L is proportional to $x_i$, a displacement QP in the direction x on the screen 6 is not proportional to $x_i$. Also with respect to the vertical direction, the displacement in the direction y is not proportional to $y_i$. As described above, the coordinates $(x_i, y_i)$ of the designated point do not coincide with coordinates $(x_j, y_j)$ of a display point on the screen since the screen 6 does not have a spherical surface. For instance, in the case where the input data carries coordinates of the designated points in lattice-shape as shown in FIG. 7A, the display points drawn on the screen 6 are distributed as shown in FIG. 7B. Thus, there has been a problem of what is called a pincushion distortion occurs.

SUMMARY OF THE INVENTION

It is, therefore, an object of the invention to provide an apparatus for displaying two-dimensional image information, in which an image of display points having coordinates which coincide with the coordinates of the designated point of input data is obtained on the display screen.

According to the invention, there is provided a two-dimensional image information display apparatus which comprises: laser beam radiating means for radiating a laser beam; drive signal generating means for generating a drive signal in accordance with input data carrying coordinates of designated points; and deflecting means for deflecting the laser beam at an angle according to the drive signal, and irradiating the deflected laser beam onto a display surface, thereby obtaining a display point, wherein the drive signal generating means has means for storing the coordinates of reference points, means for storing errors respectively indicative of a deviation of coordinates of a display point which are obtained when the coordinates of a reference point are used as coordinates of the designated point from the coordinates of the reference point, interpolating means for producing errors corresponding to the coordinates of designated point as interpolation errors by using an interpolating method, and converting means for converting the coordinates of the designated point by the interpolation errors, thereby producing converted coordinates, and for using the converted coordinates as the input data.

The two-dimensional image information display apparatus according to the present invention is configured such that the input data carrying coordinates of designated points is corrected by the interpolating method, thereby producing converted coordinates, and the drive signal is produced on the basis of the converted coordinates, so that the laser beam is irradiated onto the display surface while the laser beam is deflected in accordance with the drive signal.

DETAILED DESCRIPTION OF PREFERRED EMBODIMENTS

Figure 3:
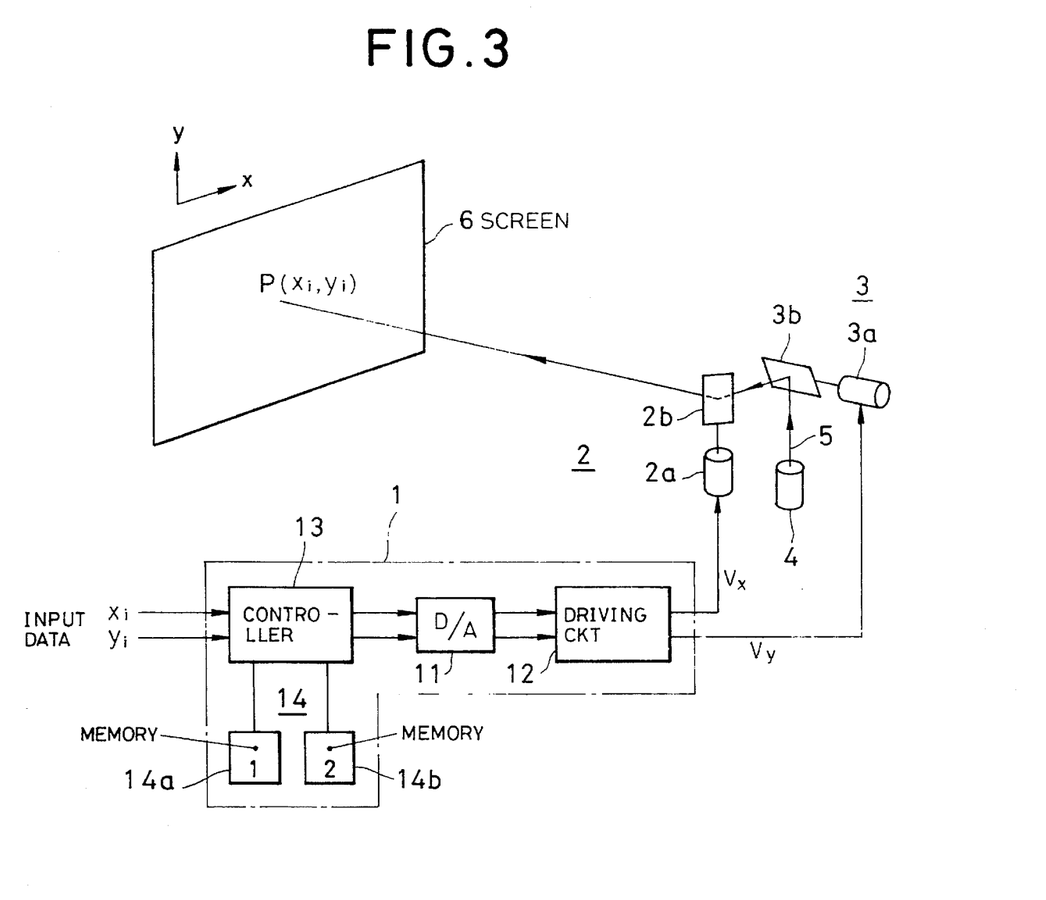
FIG. 3 is a block diagram of a two-dimensional image information display apparatus according to the present invention.
Figure 4:
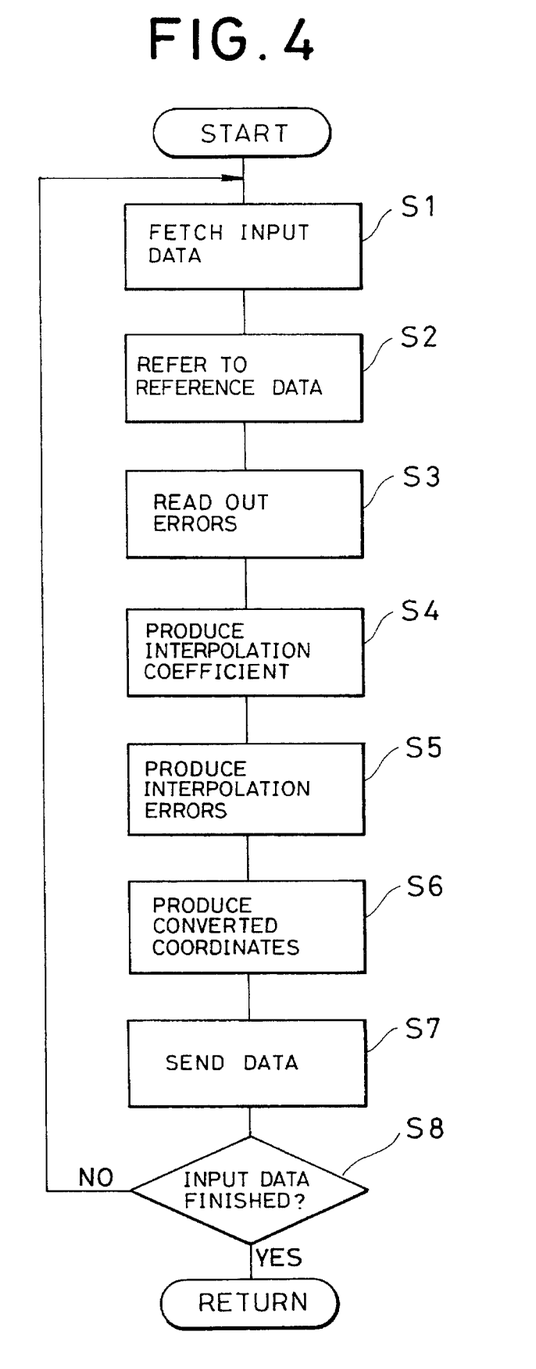
FIG. 4 is a flowchart which is executed by the controller 13 shown in FIG. 3.

An embodiment of the invention will be described hereinbelow with reference to FIGS. 3 and 4. A shown in FIG. 3, a controller 13 and a memory 14 provided as a storage device are added to the driving means 1 in the construction shown in FIG. 1. The other elements in the structure are the same as those in FIG. 1 and are designated by the same reference numerals. It is now assumed that the whole coordinates of display points on the screen 6 are constructed by, for instance, 1000 coordinates in the direction x, namely, the horizontal direction and 705 coordinates in the direction y, that is, the vertical direction. In such an arrangement, a part of the coordinates of display points, for instance, coordinates of reference points corresponding to 200 coordinates in the horizontal direction and 150 coordinates in the vertical direction is stored in a memory 14a. Data of errors corresponding to the coordinates of the reference points is stored in a memory 14b. The above errors indicate errors between the coordinates of display points displayed on the screen 6 when the coordinates of the reference points are used as the coordinates of designated points and the coordinates of designated points.

Figure 5:
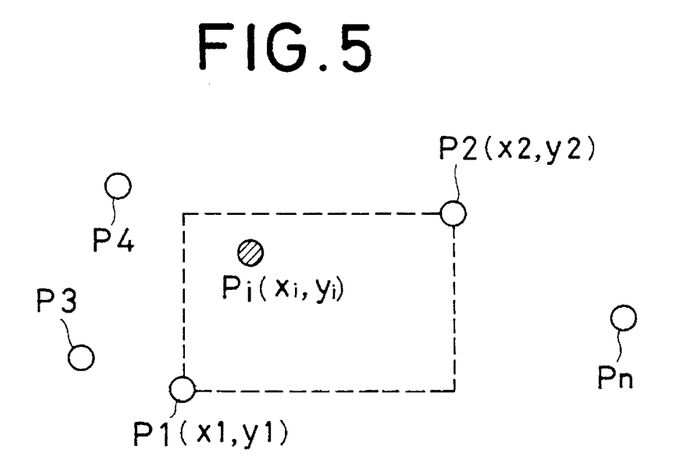
FIG. 5 is a coordinate diagram for explaining the relation between the coordinates of designated point and the coordinates of a reference point.
Figure 6:
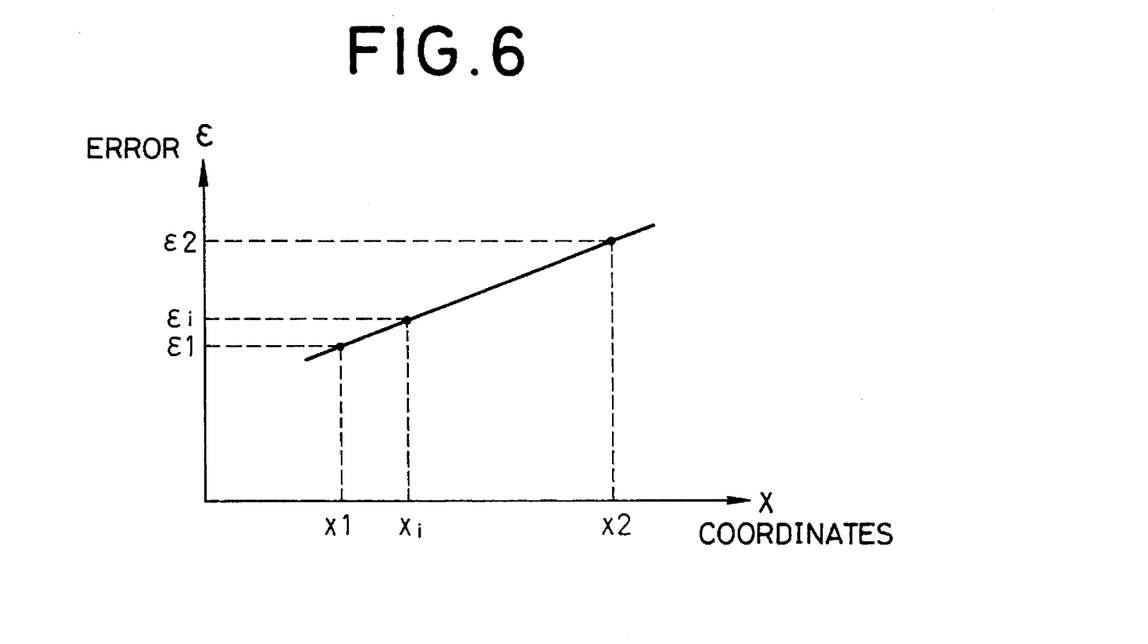
FIG. 6 is a graph for approximation for an interpolating method which is executed by the controller 13 in FIG. 3.

The operation of the embodiment shown in FIG. 3 will now be described. In a flowchart shown in FIG. 4, when input data carrying the coordinates of a designated point is supplied from a data generating circuit (not shown) (step S1), the coordinates of the reference points in the memory 14a are referred to (step S2). It is now assumed that the coordinates of a designated point $P_i(x_i, y_i)$ of the input data exist in a rectangular area which is defined by the coordinates of two reference points $P_1(x_1, y_1)$ and $P_2(x_2, y_2)$ among the coordinates of the reference points $P_1, P_2, P_3, \ldots P_n$ shown in FIG. 5. In step S3, the errors corresponding to the x and y coordinates of the coordinates of the reference point are read out from the memory 14b. As shown in FIG. 6, the errors corresponding to $x_1$ and $x_2$ are expressed by $\epsilon_1$ and $\epsilon_2$. By an interpolating method using a straight line connecting $\epsilon_1$ and $\epsilon_2$ as an approximation formula, an interpolation coefficient $K_x$ is first calculated as a gradient of such an approximation formula in accordance with the following calculating equation (1) (step S4).

$$K_x = (\epsilon_2 - \epsilon_1)/(x_2 - x_1) \quad (1)$$

An interpolation error $\epsilon_i$ of $x_i$ is produced on the basis of the interpolation coefficient $K_x$ by the following calculating equation (2) (step S5).

$$\epsilon_i = K_x \cdot (x_i - x_1) + \epsilon_1 \quad (2)$$

In steps S3 to S5, an interpolation error $\delta_i$ of the coordinate $y_i$ of the designated point is also obtained in the similar manner with respect to the y coordinate.

On the basis of the interpolation errors $\epsilon_i$ and $\epsilon_i$, converted coordinates $(x_i, y_i)$ of the designated coordinates $(x_i, y_i)$ are produced by the following calculating equations (3) and (4) (step S6). The input data using the converted coordinates as coordinates of the designated point is then transmitted from the controller 13 (step S7).

$$X_i = X_i + \epsilon_i \quad (3)$$

$$Y_i = y_i + \delta_i \quad (4)$$

When the input data is transmitted, a check is made to see if the next input data exists or not (step S8). If the answer is YES, step S1 follows and the input data is fetched and the processes in step S2 and subsequent steps are executed. If the end of the input data is determined in step S8, the execution of the coordinate conversion process will be terminated. In FIG. 3, when the input data using the converted coordinates as coordinates of designated point is supplied to the D/A converter 11 and the drive signal is produced by the drive circuit 12, the display point coordinates $(x_i, y_i)$ which coincide with the coordinates of designated point $(x_i, y_i)$ are obtained on the screen 6.

If an integer arithmetic operation of 16 bits is performed for the above calculating equations, the calculation can be performed at a high speed and a display apparatus of a high response speed can be realized. Now, assuming that, for instance, $x_1=10$, $x_2=30$, $x_i=12$, $\epsilon_1=10$, and $\epsilon_2=25$ (all of the above numerals are based on the decimal notation), however, $$K_x = 15/20 = 0.75$$

is derived from the calculating equation (1). In the case of the integer arithmetic operation, however, since the figures below decimal point are omitted, $K_x=0$. The interpolation error $\epsilon_i$ is consequently equal to 10 by the calculating equation (2) and coincides with the error $\epsilon_1$ of $x_i$ so that the interpolation will not be performed.

In another embodiment, therefore, a value 10 is multiplied to a dividend $(\epsilon_2 - \epsilon_1)$ of the equation (1) and the numerals of the solution is shifted up by one digit, so that the following calculating equation (5) is formed.

$$K_x = 10 \cdot (\epsilon_2 - \epsilon_1)/(x_2 - x_1) \quad (5)$$

In the equation (2), the result of the multiplication $K_x \cdot (x_i - y_i)$ is divided by 10 so that the numerals of the solution is shifted down by one digit, thereby the following calculating equation (6) is formed.

$$\epsilon_i = K_x \cdot (x_i - x_1)/10 + \epsilon_1 \quad (6)$$

$K_x$ is obtained as follows by the equation (5).

$$K_x = 10 \times 15/20 = 7.5$$

The numerals of the solution is rounded to $K_x=7$ because of the integer arithmetic operation. Then, the following result is obtained by the calculation of $\epsilon_i$ using the equation (6).

$$\epsilon_i = 7 \times 2/10 = 1.4$$

Also the numerals of the solution is rounded to $\epsilon_i=1$ because of the integer arithmetic operation. Therefore, a value $X_i=13$ is obtained by the equation (3), which is approximate to the true converted coordinate $x_i=11.5$ based on the arithmetic operation including decimal fraction.

In the above two embodiments, the coordinates of the reference points corresponding to a part of the whole display point coordinates on the screen 6 are stored into the memory 14a. It is, therefore, sufficient to provide 480 k bits as a capacity of the memory 14. In recent years, however, the progress of high density and low cost IC memories such as DRAM or the like is taking place. It is therefore also possible to store the errors corresponding to all of the coordinates of the display points into the memory 14. In such a case, although a capacity of about 6 M bytes is needed for the memory 14, it is unnecessary to produce the interpolation errors, the errors corresponding to the coordinates of designated point are searched, and the converted coordinates can be produced only by the equations (3) and (4) of addition operation, so that the calculation of a higher speed can be realized.

As described above, in the two-dimensional image information display apparatus according to the intention, when the input data carrying the coordinates of designated points is to be drawn on the display screen, the coordinates of reference points, and errors indicative of the deviation of the coordinates of display points which are obtained when the coordinates of the reference point are used as the coordinates of the designated points, are stored, errors which do not correspond to the coordinates of the designated point are produced as interpolation errors by an interpolating method, converted coordinates are produced by the interpolation errors, and the converted coordinates are used as coordinates of designated point. The display point coordinates which coincide with the coordinates of designated point of the input data, consequently, can be obtained on the display screen.

What is claimed is:

1. A two-dimensional image information display apparatus comprising:

laser beam radiating means for radiating a laser beam;

input means for inputting a digital signal representing a plurality of coordinates of designated points;

drive signal generating means for generating a drive signal in accordance with the coordinates of designated points and for eliminating image distortion caused by differences in distance between the laser beam radiating means and different points on the display screen; and deflecting means for deflecting an angle of the laser beam in accordance with the drive signal, for irradiating the deflected laser beam onto a display screen having a known curvature, wherein said drive signal generating means includes:

means for storing coordinates of reference points, the number of said reference points being less than the number of all possible coordinates of designated points;

means for storing predetermined errors corresponding to said reference points indicative of a deviation in coordinates of a display point obtained when the coordinates of a reference point are used as the coordinates of a designated point from the stored coordinates of said reference point, said deviation being a function of said known curvature;

interpolating means for calculating an error corresponding to one of said designated points by interpolating between the stored predetermined errors corresponding to at least two of said reference points adjacent said designated point; and correcting means for correcting the coordinates of said designated point using the error calculated by said interpolating means, and for using said corrected coordinates as said drive signal.

2. An apparatus according to claim 1, wherein said interpolating means multiplies by a predetermined number the difference in the stored errors corresponding to the at least two reference points adjacent said designated point to produce a first result, divides the first result by the difference in the stored coordinates for the at least two reference points adjacent said designated point to produce a second result, multiplies the second result by the difference in the coordinates for the designated point and the stored coordinates for one of the two reference points adjacent the designated point to produce a third result, divides the third result by the predetermined number to produce a fourth result, and adds to the fourth result the stored errors corresponding to the one of the two reference points adjacent said designated point to produce the error corresponding to the designated point.

* * * * *

UNITED STATES PATENT AND TRADEMARK OFFICE
CERTIFICATE OF CORRECTION

PATENT NO. : 5,504,496

DATED : April 2, 1996

INVENTOR(S) : Satoru Tanaka et al.

It is certified that error appears in the above-identified patent and that said Letters Patent is hereby corrected as shown below:

Column 3, line 65, replace the second occurrence of "$\epsilon_1$" with --$\delta_1$--.

Signed and Sealed this

Sixth Day of August, 1996

Attest:

BRUCE LEHMAN

Attesting Officer    Commissioner of Patents and Trademarks